US012801873B2

(12) United States Patent
Yli-Peltola

(10) Patent No.: US 12,801,873 B2
(45) Date of Patent: Nov. 17, 2026

(54) RFID TAG DETECTION SYSTEM FOR USE WITH AN INTELLIGENT CABINET

(71) Applicant: Intelligent Fridges B.V., Nieuw-Vennep (NL)

(72) Inventor: Ilkka Yli-Peltola, Kangasala (FI)

(73) Assignee: Intelligent Fridges B.V., Nieuw-Vennep (NL)

( * ) Notice: Subject to any disclaimer, the term of this patent is extended or adjusted under 35 U.S.C. 154(b) by 0 days.

(21) Appl. No.: 18/291,973

(22) PCT Filed: Aug. 16, 2022

(86) PCT No.: PCT/IB2022/057651

§ 371 (c)(1),
(2) Date: Jan. 25, 2024

(87) PCT Pub. No.: WO2023/021415

PCT Pub. Date: Feb. 23, 2023

(65) Prior Publication Data

US 2024/0378403 A1 Nov. 14, 2024

(30) Foreign Application Priority Data

Aug. 20, 2021 (SE) .................................... 2151012-8

(51) Int. Cl.
*G06K 7/10* (2006.01)
*G06K 17/00* (2006.01)
(Continued)

(52) U.S. Cl.
CPC ..... *G06K 7/10316* (2013.01); *G06K 17/0022* (2013.01); *G06Q 20/18* (2013.01);
(Continued)

(58) Field of Classification Search
CPC ........ G07C 9/28; G07C 9/00309; G07C 9/38; G07C 2009/00523; G07C 9/29;
(Continued)

(56) References Cited

U.S. PATENT DOCUMENTS

2014/0225713 A1* 8/2014 McIntyre .............. H04W 48/04 340/5.61
2014/0316561 A1 10/2014 Tkachenko et al.
(Continued)

FOREIGN PATENT DOCUMENTS

CN 209915445 U 1/2020
EP 3722989 A1 10/2020
(Continued)

OTHER PUBLICATIONS

Radivojevie, "The Shielding Effectiveness Measurements of a Rectangular Enclosure Perforated with Slot Aperture" (Year: 2017).*
(Continued)

*Primary Examiner* — Thien T Mai
(74) *Attorney, Agent, or Firm* — Ipsilon USA—NLO

(57) ABSTRACT

A detection system for detecting RFID tags comprises a cabinet (2) having a door (21) movable between a closed state and an open state. An RFID reader system (27) is provided, and connected to at least one internal reader antenna (25; 25*a-d*) arranged inside said cabinet (2), for reading RFID tags within the cabinet (2), and at least one external reader antenna (26*a-d*) arranged outside the cabinet (2), for reading RFID tags outside the cabinet (2). The RFID reader system (27) is configured to detect RFID tags having been moved out from said cabinet (2) based on the readings made by both the internal reader antenna(s) (25; 25*a-d*) and the external reader antenna(s) (26*a-d*). A corresponding method is also disclosed.

17 Claims, 3 Drawing Sheets

(51) Int. Cl.

| | |
|---|---|
| ***G06Q 10/087*** | (2023.01) |
| ***G06Q 20/18*** | (2012.01) |
| ***G06Q 20/20*** | (2012.01) |
| ***G07C 9/28*** | (2020.01) |
| ***G07C 9/29*** | (2020.01) |

(52) U.S. Cl.
CPC ............. *G06Q 20/203* (2013.01); *G07C 9/28* (2020.01); *G07C 9/29* (2020.01)

(58) Field of Classification Search
CPC ...... G07C 2009/00579; G07C 9/00571; G07C 9/00944; G07C 2209/63; G07C 2009/00333; G07C 2009/00396; G06Q 20/00; G06Q 20/18; G06Q 20/203; G06Q 20/204; G06Q 20/206; G06Q 20/201; G06Q 20/04; G06K 17/0022; G06K 19/07749; G06K 19/07786; G06K 7/0008; G06K 19/0723; G06K 19/0703; G06K 7/00; G06K 7/10346; G06K 7/10356; G06K 7/10316
See application file for complete search history.

(56) References Cited

U.S. PATENT DOCUMENTS

| | | | | |
|---|---|---|---|---|
| 2018/0093830 | A1 | 4/2018 | Uno et al. | |
| 2021/0174328 | A1* | 6/2021 | Kojima ................ | G06Q 10/087 |
| 2021/0342770 | A1* | 11/2021 | Li ...................... | G06Q 30/0185 |
| 2022/0188529 | A1* | 6/2022 | Markman .......... | G06K 19/0725 |
| 2022/0292443 | A1* | 9/2022 | Matsuura ............... | G06Q 30/06 |

FOREIGN PATENT DOCUMENTS

| | | | | |
|---|---|---|---|---|
| FR | 3073378 | A1 | 5/2019 | |
| WO | WO-2007108576 | A1 * | 9/2007 | ............ F16B 37/048 |
| WO | WO-2018112224 | A1 * | 6/2018 | ........... G01S 13/765 |
| WO | 2020128937 | A1 | 6/2020 | |

OTHER PUBLICATIONS

Automatic chocolate vending machine (Year: 2019).*
International Search Report from corresponding PCT application No. PCT/IB2022/057651, mailed Nov. 8, 2022.

* cited by examiner

RFID TAG DETECTION SYSTEM FOR USE WITH AN INTELLIGENT CABINET

This application is a U.S. National Phase under 35 U.S.C. § 371 of International Application No. PCT/IB2022/057651, filed Aug. 16, 2022, which claims priority under 35 U.S.C. §§ 119 and 365 to Swedish Application No. 2151012-8 filed Aug. 20, 2021.

TECHNICAL FIELD OF THE INVENTION

The present invention is related to a radio frequency identification (RFID) detection system useable in an intelligent cabinet, as well as a method for detecting an RFID tag.

BACKGROUND

RFID tags are nowadays used more and more frequently, and for a wide variety of applications, such as in smart labels/tags. The RFID tag is conventionally arranged as a flat configured transponder, e.g. arranged under a conventional print-coded label, and includes a chip and an antenna. Smart labels offer advantages over conventional barcode labels, such as higher data capacity, possibility to read and/or write outside a direct line of sight, and the ability to read multiple labels or tags at one time. It is also known to incorporate RFID labels directly in a packaging material, to form so-called intelligent packaging products.

One application for RFID tags which is becoming increasingly interesting is in packages comprising food products and the like, There is a recent trend to turn traditional convenience stores into self-service fulfilment centres located regionally or locally, close to homes, workplaces, transport hubs and leisure activities. To this end, unmanned, intelligent cabinets may be used, such as intelligent fridges and the like.

The intelligent cabinets may be used to sell, in an automated way, various products such as consumer products, groceries, beverages, snacks etc. Each product in the intelligent cabinet is equipped with an RFID tag.

The shopping process in an intelligent cabinet is typically the following:

- Authentication of a consumer, e.g. done by the consumer using his smartphone and a smartphone app. Hereby, the consumer is identified and a connection to the consumer's personal payment account or the like is established. When the consumer has been authenticated, the system will send a command to an electric lock of the intelligent cabinet to open the locked door.
- The consumer may then open the door and pick out the products he wants to purchase, and thereafter close the door.
- When the door is closed, the system will run an inventory round inside the intelligent cabinet. Since each product is RFID tagged with tags with individual identification codes (for example Electronic Product Code, "EPC" or Unique Identifier ("UID"), the system will detect which products are still inside the cabinet, and determine which product(s) that are missing compared to the previously made inventory round.
- The system may then display the purchased items and their cost, e.g. on a display on the intelligent cabinet.
- The system will then charge the corresponding amount from the consumer's payment account, and may also send a receipt to his mobile device.

The cabinet is then ready to receive the next user.

The system always knows the inventory of the cabinet. When the inventory levels are determined to be low, the system will trigger a replenishment cycle. Therefore, a replenishment batch of products may be delivered to the intelligent cabinet from a centralized warehouse, distribution center or the like.

Intelligent cabinets may be used in various locations, such as in office buildings, fitness and sport centers, schools, hotels, gas stations, and the like. Kiosks and small convenience stores can also be converted into fully digitalized unmanned stores with no personnel by use of such intelligent cabinets. With an offering of 10-15 intelligent cabinets, a small store can provide an assortment that represents a typical traditional kiosk. In facilities that have limited opening hours, such as lunch restaurants, cafés and the like, intelligent cabinets can offer a basic offering of food, snacks and daily goods outside the opening hours.

The intelligent cabinets can be arranged for indoor use, but may also be designed for outdoor use and tough conditions.

Such an intelligent cabinet is e.g. disclosed in WO 2020/128937.

However, present systems are not entirely satisfactory, and many false inventory readings occur due to the complex electromagnetic environment inside the cabinet.

Generally, in order to determine that a product has been removed from the cabinet, it is important that the RFID tags cannot be read when outside the cabinet. When an RFID tag is brought outside, the reader system inside the cabinet is unable to detect it, and this is determined to correspond to a removal and purchase of the corresponding product. To this end, the cabinets are made as RF isolated structures, in order to prevent RF energy to pass through the walls and door of the cabinet. RF isolation is achieved by building a "Faraday cage" around the cabinet volume, and usually this involves metallic cabinet walls, EMI coated door windows, and conductive gaskets, glue and/or tape to seal all gaps. However, such RF isolation is relatively expensive, and would still not be entirely reliable.

Achieving sufficient level of RF isolation, preferably ideally more than 30 dB attenuation, requires very carefully implemented conductive structures with no gaps. This is costly and cumbersome, and in practice sufficient RF isolation is still difficult to achieve since RF power leaks even through minor gaps in range of >100 microns, and managing such level of constant quality in cabinet production is challenging.

Too low RF isolation means that the system may not be able to distinguish if the tag is inside or outside the cabinet.

One known solution to address the problem of un-ideal RF isolation uses computing algorithm to detect tag removal. Such system uses cabinet internal reader system to monitor certain tag parameters, such as RSSI, to detect movement and interprets that a tag has been taken outside cabinet. Such systems are e.g. known from EP 3722989 and FR 3073378. However, in practice, there are accuracy limitations for such system when used in intelligent cabinets due to the complex EM environment therein. For example, and end user may remove the product but return it to a different location in the cabinet. Tag parameters are strongly influenced by the other products and materials inside the cabinet, and also the location in space, e.g. due to standing RF wave patterns which are formed inside the cabinet. This makes it difficult to detect removal of tag also when using such computing algorithms.

There is therefore a need for a detection system for with e.g. intelligent cabinets which produced cost-effectively, and/or which has better performance and properties. In particular, there is a need for a detection system that can detect removal of RFID tags from the cabinet with more accuracy and reliability. There is also a need for a detection system which is cost- and space-effective.

SUMMARY

It is therefore an object of the present invention to provide a detection system for RFID tags, as well as a method for detecting RFID tags, for with a cabinet, and which alleviate at least part of the above-discussed problems, and at least partially address one or more of the above-mentioned needs.

This object is obtained by means of a detection system and method in accordance with the appended claims.

According to a first aspect of the invention, there is provided a detection system for detecting RFID tags, the detection system comprising:

a cabinet having an door movable between a closed state and an open state;

an RFID reader system; and at least one internal reader antenna connected to the RFID reader system and arranged inside said cabinet, for reading RFID tags within said cabinet, characterized in that the detection system further comprises at least one external reader antenna connected to the RFID reader system and arranged outside said cabinet, for reading RFID tags outside said cabinet; and in that the RFID reader system is configured to detect RFID tags having been moved out from said cabinet based on the readings made by both the internal reader antenna(s) and the external reader antenna(s).

The detection system is useful for RFID enabled cabinets, and may be used together with, or be integrated in, a system for automated inventory management. In particular, the detection system is useable to detect when a product has been purchased and removed from the cabinet. RFID tag are attached on the products available for purchase and stored inside the cabinet. The internal reader antenna(s) inside the cabinet may perform inventory reading before and after the cabinet door is opened/closed. Difference between inventories is then analyzed to detect purchased items. Due to the additional reading of tags with the external antenna(s) the cabinet reliable detect all removed products (tags) and avoid false inventory reads which may otherwise occur due to the complex electromagnetic environment inside the cabinet.

The detection system may be used in any type of intelligent cabinet, such as in an intelligent/smart fridge, but also in other types of cabinets where automated inventory management is used or needed. The cabinet may be retail or industrial cabinet.

The internal reader antenna(s) may be structured and operated in a conventional way, as is per se known, and as is e.g. presently used in Stora Enso Intelligent Fridge, provided by the applicant. The internal reader antenna(s) may e.g. be arranged on, or integrated with, shelves of the cabinet. The internal reader antenna(s) may be connected to the RFID reader system via a cable or the like.

The use of the additional external reader antenna(s) provide extra security and reliability, enabling a more efficient detection of removal of RFID tags from the cabinet, and efficiently avoiding mis-readings, false readings, attempts to misuse the system, such as cheating and stealing, etc.

As discussed in the foregoing, false tag readings or user cheating could occur in previously known systems due to non-ideal RF isolation. It may happen that there is a leak in cabinet RF isolation and that tag remains visible for internal antennas even after removal from the cabinet, at least in close proximity of the cabinet. With the external reader antenna(s) as part of the reading system, a logic may be used that compares inventories seen by the internal and external antennas. As a starting point, the inventory list is built with the internal reader antenna(s) in the background, when there is no user/customer interaction. When a user/customer comes and removes a product from cabinet, this can then be detected reliably and efficiently. For example, if a tag was known to be inside cabinet, due to reading with the internal reader antenna(s), and then subsequently becomes readable by the external reader antenna(s), the RFID tag may reliably be determined to be located outside the cabinet, even in cases where it remain readable by the internal reader antenna(s).

The detection based on readings from both internal and external reader antennas also relaxes the requirements for cabinet RF isolation.

RF isolation significantly increases cabinet material and assembly costs. However, with the new detection system, less RF isolation could be used, and the RF shielding used could also be less efficient, and consequently less costly. The cost to implement an external reader antenna is comparatively lower than the cost to implement high quality RF isolation. With the new detection system, it may e.g. suffice to provide RF isolation on one or more major conductive surface(s), such as covering the door window with an electromagnetic interference (EMI) film. Provision of the internal and external reader antennas on different sides of such a major surface will sufficiently separate the signals received by the antennas.

The new detection system may also be useful in improving the reliability of tag detection inside the cabinet.

For example, there may occasionally be situations where some tags becomes very difficult to read inside cabinet, e.g. when shadowed by other products or due to dynamics of the RF field composition, and in such cases the inventory list may not match with the actual products in the cabinet. In those cases, reading with external reader antenna(s) provides an extra layer of accuracy. For example, after the door has closed, it may be observed if any tags were brought to the outside of the cabinet or not, and if such a tag was detected, this information may be used to correct the inventory list built based on the information from the internal reader antenna(s).

The external reader antenna would in most cases operate in free air type conditions and doesn't suffer from dynamics of the cabinet internal environment, and, thus, allow more stable reading results.

The invention is further based on the realization that reading of RFID tags with the external reader antenna(s) only requires a few seconds, and can typically be completed in a few milliseconds, after the product was removed from the cabinet and the door closed. During the purchasing the user is typically standing in front of the cabinet and following the payment process to be completed on the screen. This would give enough time for the RFID reader system to obtain information from the external reader antenna(s) well before the user walks away.

The RFID reader system is preferably configured to determine when the door of the cabinet is opened and closed. For example, the system may comprise a sensor connected to the RFID reader system and arranged to determine when the door is in a closed and open state, respectively. Various types of sensors may be used for this purpose, such as a visual sensor, a temperature sensor, a pressure sensor, etc. However, in a preferred embodiment, the sensor is a switch or the like connected to the door, for example arranged to open or close an electric circuit when the door is opened and closed.

At least one, and preferably each of, the external reader antennas is preferably configured to have a reading zone outside the cabinet with at least 10 dB attenuation towards the inside of the cabinet. Hereby, the risk of reading RFID tags inside the cabinet when the cabinet is closed is minimized.

One or more of the external reader antenna(s) may also be configured to isolate signals between the cabinet's inner and outer space. To this end, the external reader antenna may have an independent ground plane of its own, or in other ways be configured such that the radiation pattern is focused forward, i.e. generally away from the interior of the cabinet, and not backwards, i.e. towards the interior of the cabinet. This would be of particular advantage in cases where the cabinet in itself has a relatively low attenuation, e.g. below 10 dB, or where the cabinet attenuation has strong directional variation, such as with much leakage through at the boundaries. In such situations, this could be compensated by the additional isolation provided by the external reader antennas.

The RFID reader system is preferably configured to detect RFID tags having been moved out from said cabinet based on the readings made by both the internal reader antenna(s) and the external reader antenna(s) when the door has been determined to be in a closed state. The RFID reader system may e.g. be configured to disregard signals received from the reader antennas when the door has been determined to be in an open state. This avoids mis-readings that may occur when the door is opened.

The cabinet is preferably an RF attenuating cabinet, wherein the door and walls of the cabinet are RF attenuating, and preferably also the boundaries there between. In an embodiment, the door and walls of the cabinet, and preferably also the boundaries there between, have an RF attenuation of at least 10 dB. The attenuation could b 30 dB or more. However, preferably the attenuation does not exceed 30 dB, and is preferably in the range of 10-30 dB, such as in the range of 10-25 dB, 10-20 dB or 10-15 dB. It has been found that such relatively limited shielding would still be sufficient to provide adequate distinction between the readings from the internal and external reader antennas. Similar attenuation properties may also be provided at all boundaries between door and walls at an operating frequency. The attenuation may also vary towards different directions in space and may be a function of frequency.

The RFID reader system may further be configured only to use readings from the external reader antenna(s) when the signal strength is exceeding a predetermined threshold value. For example, the RFID reader system may be configured to disregard readings from the external reader antenna(s) when the signal strength, such as the received signal strength indication (RSSI) is below the predetermined threshold value. Hereby, it is further ensured that accidental readings from the external reader antenna(s) of tags inside the cabinet are not considered.

The RFID reader system may further be configured only to use readings from the internal reader antenna(s) when the signal strength is exceeding a predetermined threshold value. For example, the RFID reader system may be configured to disregard readings from the internal reader antenna(s) when the signal strength, such as the received signal strength indication (RSSI) is below the predetermined threshold value. Hereby, it is further ensured that accidental readings from the internal reader antenna(s) of tags outside the cabinet are not considered.

In an embodiment, at least one of the external reader antenna(s) is arranged on a front side of the cabinet. Since the products will be taken out from the cabinet through the door, which is at the front side of the cabinet, it has been found that arrangement of external reader antenna(s) on this side is most efficient to read RFID tags having been removed from the cabinet.

In particular, at least one of the external reader antenna(s) may be arranged on at least one of: the door, a door handle, a payment terminal holder, and/or above the door. These locations have all been found to be very efficient in establishing contact with, and reading, RFID tags that have been removed from the cabinet, and also are well RF separated from the inside of the cabinet. Further, when arranged on, or in close vicinity to, the door, an EMI film arranged on the door may serve as a ground plane for the antenna(s).

In a preferred embodiment, the external reader antenna(s) is/are arranged at a distance from any potential points of RF leakage. For example, the external reader antenna(s) may be arranged at a distance from all boundaries of a door opening of the door. The distance is preferably at least 5 cm, and preferably at least 10 cm, and most preferably at least 15 cm.

In embodiments, there may be provided only one external reader antenna. However, it is also feasible to use more than one external reader antenna, such as 2 or 3 antennas, or even more. In case several external reader antennas are used, they are preferably arranged at different positions on the cabinet, thereby providing complementary reading coverage.

At least one of the external reader antenna(s) is preferably a directional antenna. Use of directional antennas limits the reading coverage, and the area in which reading can be made. Hereby, the risk of reading RFID tags which occur outside the cabinet, but which have not been recently removed from the cabinet, can be limited. Preferably, the directional antennas are directed in such a way that the coverage area is reduced only to an area relatively close to the cabinet, and in particular to the front side of the cabinet.

In embodiments, there may be provided only one internal reader antenna. However, it is also feasible to use more than one internal reader antenna, such as 2 or 3 antennas, or even more. In case several internal reader antennas are used, they are preferably arranged at different positions within the cabinet, thereby providing complementary reading coverage.

At least one of the internal reader antenna(s) is preferably an omnidirectional antenna, thereby providing coverage over a relatively great part of the internal cavity of the cabinet. However, one or more of the internal reader antenna(s) may be also be directional antenna(s), e.g. for cases where the signal strength needs to be boosted in certain directions or towards certain areas.

The door of the cabinet is preferably provided with a window covered with an electromagnetic interference film. Hereby, RF separation is obtained, minimizing the risk of the external reader antenna(s) reading RFID tags which are still inside the cabinet.

In one embodiment, the RFID reader system is configured for the detection of RFID tags having been moved out from the cabinet based on a first reading from the internal reader antenna(s) of the RFID tag, prior to the door being moved into an open state, and a subsequent second reading from the external reader antenna(s) of said RFID tag, after the door again being moved into a closed state.

Thus, hereby it may be determined that a product has been removed from the cabinet when the RFID tag of the product has been read by an internal reader antenna prior to the door opening, and the same RFID tag then being read by an external reader antenna after the door has been closed. This may also be confirmed if the RFID tag then, after the door closing, is no longer readable by the internal reader antenna(s), but is not dependent on this.

The first reading from the internal reader antenna(s) of said RFID tag may be from a time period close to the movement of the door to the open state, during which no other openings of the door has been made. Thus, the first reading would then correspond to the latest inventory list update prior to the latest opening of the door.

If the RFID tag reading from the external reader antenna does not correspond to any item on the latest inventory list, this reading may be disregarded, and not registered as a purchase.

However, additionally, or alternatively, the first reading from the internal reader antenna(s) of said RFID tag may be a stored historic reading from the internal reader antenna(s).

This may e.g. be used, as an additional measure, when an RFID tag read by an external reader antenna does not match any item in the latest inventory list. In this case, the RFID reader system may compare the read RFID tag information with stored historic inventory list data. This makes it possible to detect a removal of a product also for situations where a product in the cabinet has become unreadable for the internal reader antenna(s) for reasons such as being obscured by later placed products, etc.

If the RFID tag reading from the external reader antenna does not correspond to any item even on the historic inventory list(s), this reading may be disregarded, and not registered as a purchase.

The comparison with current and/or historic inventory lists hereby functions as a filter, preferably realized in software, which alleviates the risk of the external reader antennas detecting RFID tags other than the ones removed from the cabinet.

However, it is also possible to register read RFID tags from an external reader antenna even if not part of any current or historic inventory list. This may be used by default, or depending on other conditions being met, such as the signal strength of the reading being sufficiently high, e.g. exceeding a threshold level, the distance to the cabinet when read being determined to be sufficiently small, such as being below a threshold level, or the like. Thus, in such situations, the product with the RFID tag read by the external reader antenna may still be registered as a purchase, and the inventory list may be updated accordingly.

The internal and external reader antennas are preferably antennas which transmits and receives signals from RFID tags and operating within the Ultra High Frequency (UHF) band, and in particular in a band within the range of 750-1400 MHz, and preferably within the range of 860-960 MHz.

The internal and external reader antennas may be arranged to communicate with RFID tags that are passive, i.e. which are powered by the reader's electromagnetic field, or active, i.e. powered by an onboard battery.

According to another aspect of the invention, there is provided a method for detecting RFID tags, the method comprising:

- reading RFID tags arranged inside a cabinet with at least one internal reader antenna connected to an RFID reader system;
- determining that a door of said cabinet has been moved from a closed state to an open state, and then again moved back to the closed state;
- reading RFID tags arranged outside the cabinet with at least one external reader antenna connected to the RFID reader system; and
- determining that an RFID tag has been moved out from said cabinet when the RFID tag was read by the internal reader antenna(s) prior to said movement of the door, and the RFID tag was read by the external reader antenna(s) after said movement of the door.

It will be appreciated that the above-mentioned detailed structures and advantages of the first aspect of the present invention also apply to the further aspects of the present invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

Figure 1A:
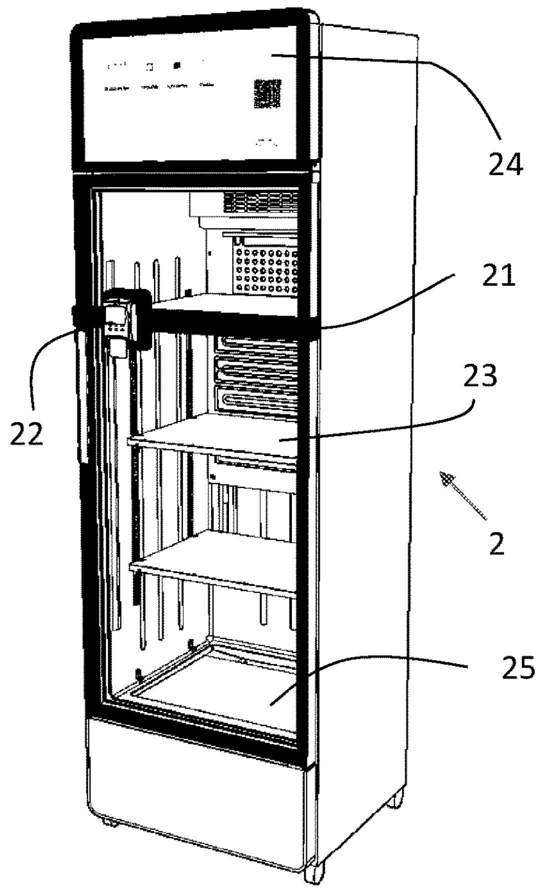
FIGS. 1*a* and 1*b* are schematic perspective view of an intelligent cabinet in accordance with an embodiment of the present invention.

In the following detailed description preferred embodiments of the invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention, such as the dimensions of the antennas, etc. It is further to be appreciated that whereas the embodiments discussed in the following are primarily related to smart fridges and the like, the detection system can also be used for many other applications where products with RFID tags are stored in a cabinet, such as in storage rooms, retail facilities, convenience stores, etc.

With reference to FIG. 1, an intelligent cabinet 2 may comprise a housing, provided with a door 21 with a remotely controlled lock 22. The cabinet may further be provided with at least one shelf 23, and preferably a plurality of shelves. The cabinet may further be provided with an externally facing display 24.

In the illustrative embodiment, the intelligent cabinet is a smart fridge. However, the cabinet may also be a smart refrigerator, or a cabinet for storage of products at room temperature, or even at somewhat elevated temperatures.

The intelligent cabinet may comprise a purchase identification system (not shown) for identifying the consumer and connecting to the consumer's personal payment account. This is typically done by consumer using his personal mobile device, e.g. a smartphone, e.g. to scan a QR code shown on the smart fridge display. The QR code may launch a mobile app (e.g. Alipay, Wechat Pay, MobilePay, Swift or similar) on the mobile device and thus identifying the consumer. However, as would be appreciated by the skilled reader, other types of identifying methods and payment methods are possible e.g. via the consumer's credit card.

The intelligent cabinet is arranged to house a storage for RFID tagged products, each product preferably having a package, wherein each product packaging is equipped with an RFID tag with individual identification codes (for example Electronic Product Code, "EPC" or Unique identifier "UID".

The intelligent cabinet further preferably comprises a lockable, door 21, which is openable after identification of the consumer.

Further, the intelligent cabinet comprises an RFID reader system and one or more internal reading antenna(s) connected to the RFID reader system for reading the RFID tagged products in the storage of the intelligent cabinet.

The RFID reader system comprises a software system of the intelligent cabinet, such that the system can detect and identify what products are inside the cabinet. As the system also knows what items were inside the cabinet before the consumer opened the door, it can deduct which products the consumer took out (=purchased). Based on this, the system can consequently determine which exact product ID's the consumer purchased.

A purchase procedure may typically be made as follows:

Identifying the consumer via the consumer's mobile device, e.g. a smartphone. A preferred method is that the consumer using his smartphone to scan a QR code shown on the display 24 of the intelligent cabinet. The QR code launches a mobile app (such as Alipay, Wechat Pay, MobilePay, Swift or similar) on the consumer's mobile device and connecting to the consumer's personal payment account. However, other types of identifying methods are possible e.g. via the consumer's credit card.

After identifying of the consumer, the system will open the lock 22, thereby unlocking the locked door 21 to the cabinet, such that the consumer can open the door. When the door is open the consumer can pick out desired products with packaging from the cabinet. Each product packaging is preferably equipped with an RFID tag with individual identification codes (for example Electronic Product Code, "EPC" or Unique identifier "UID". Thereafter, the consumer closes the door 21 and the door locks automatically.

When the door 21 is locked the system will automatically run an inventory round to detect which products that remains, to form an updated inventor list, and also to detect which packaging(s) that have been picked out from the cabinet by the consumer. The detection functionality will be discussed in greater detail in the following.

The system will thereafter automatically charge the cost for the purchased products from the consumer's payment account and sending a receipt to the mobile device.

Figure 1B:
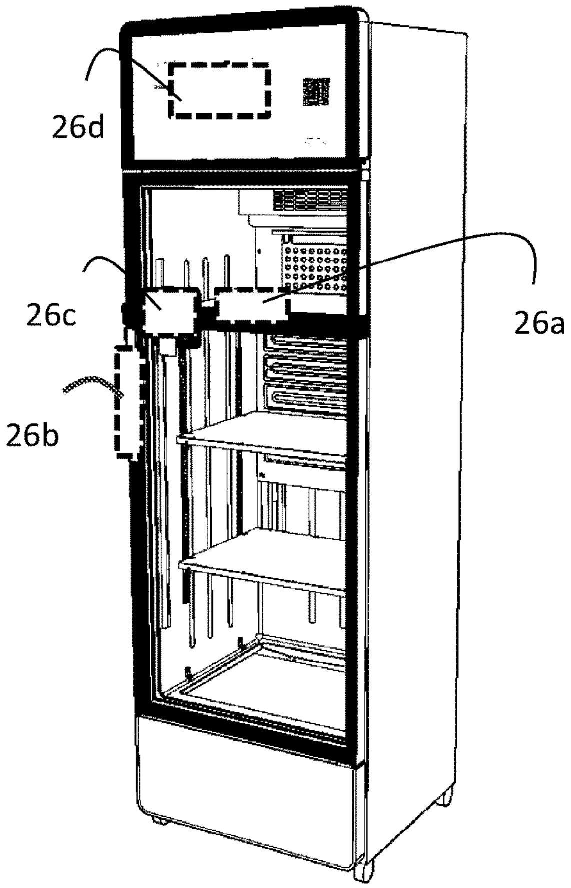
Figure 2:
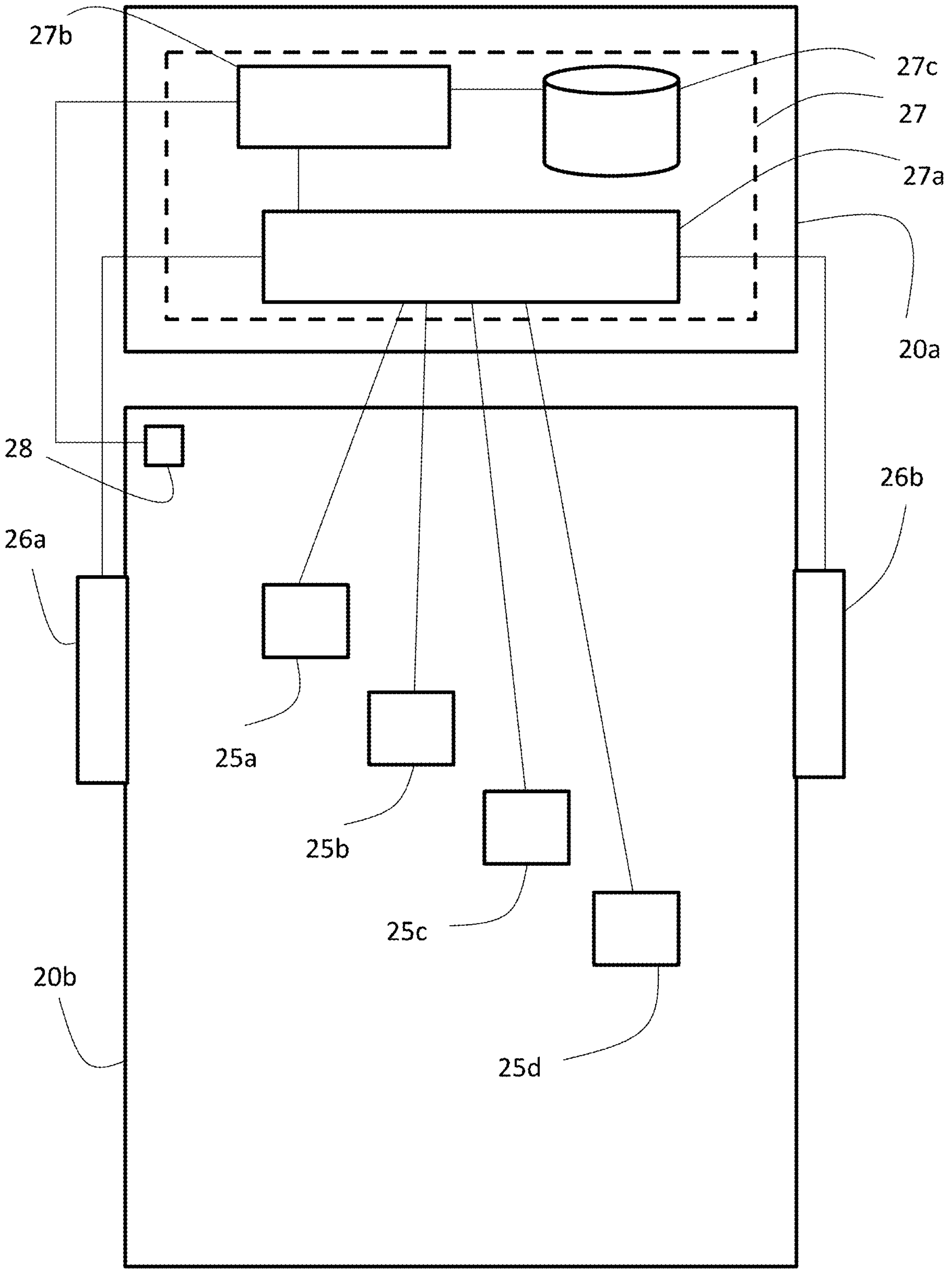
FIG. 2 is a schematic block diagram of an intelligent cabinet in accordance with another embodiment of the present invention.

With reference to FIGS. 1*a*, 1*b* and 2, the detection system e.g. realized in the above-discussed intelligent cabinet comprises an RFID reader system 27, at least one internal reader antenna 25, 25*a-d* connected to the RFID reader system 27 and arranged inside the cabinet, for reading RFID tags within the cabinet, and at least one external reader antenna 26*a-d* connected to the RFID reader system 27 and arranged outside the cabinet, for reading RFID tags outside the cabinet. As will be discussed in more detail in the following, the RFID reader system is configured to detect RFID tags having been moved out from the cabinet based on the readings made by both the internal reader antenna(s) 25, 25*a-d* and the external reader antenna(s) 26*a-d*.

The RFID reader system comprises an RF reader 27*a*, arranged to communicate with the antennas. The RFID reader system further comprises a controller 27*b* arranged to receive information from the RF reader, and to analyze and take actions on this information. The controller 27*b* may also be responsible for carrying out the authentication and/or purchase operations, as discussed in the foregoing. In particular, the controller may be controlling the door lock, the door sensor (see below), keeping and updating of the inventory, and/or the payment system. The controller may thus be seen as an overall controller for the intelligent cabinet. The RFID reader system may further comprise a data storage or database 27*c*, in which current and possibly also old, historic inventory lists may be stored and accessible.

The internal and external reader antennas may be connected to the RF reader, but also to other parts of the RFID reader system, such as the controller.

The RFID reader system here comprises a single controller and a single RFID reader. However, more than one controller and/or more than one RFID reader may be provided in the RFID reader system. In case two or more RFID readers are incorporated in the RFID system, the antennas may be connected to different RFID readers.

The RFID reader system is here shown as a single unit, comprising the RF reader, controller and data storage modules. However, some or all of these modules may also be arranged in separate units, being connected to each other by wired or wireless data communication connections. Further, a single controller may be connected to two or more RF readers. Further, as will be discussed in more detail in the following, at least part of the functions of the controller may also be provided by a separate, external controller. Thus, the controller may be a single unit, or form a distributed control, distributed over several units.

Thus, the modules/units forming the RFID reader system may be physically separated components, may be omitted, combined or further separated into a variety of different components, sharing different resources as required for the particular implementation of the embodiments disclosed (or apparent from the teachings herein). The modules/units, such as the RFID reader, the controller and the database, may be realized as one or more hardware, software, or hybrid components residing in (or distributed among) one or more local and/or remote computer or other processing systems. Indeed, even a single general purpose computer (or other processor-controlled device), executing a program stored thereon, or on an external storage unit, may be used to realize the RFID reader system. The controller may be realized as any device used to process information (e.g., microprocessor, discrete logic circuit, application specific integrated circuit (ASIC), programmable logic circuit, digital signal processor (DSP), etc.).

The cabinet 2 is preferably an RF attenuating cabinet, or at least a storage space 20*b* thereof, such as in an overhead compartment, wherein at least the door 21, and preferably also the walls of the cabinet are RF attenuating. In an embodiment, the door and walls of the cabinet have an RF attenuation of at least 10 dB, and preferably not exceeding 30 dB, and preferably in the range of 10-30 dB, such as in the range of 10-25 dB, 10-20 dB or 10-15 dB. Thus, in the cabinet, RF isolation may be provided on one or more major conductive surface(s), such as covering the window of the door 21 with an electromagnetic interference (EMI) film.

The internal reader antenna(s) 25*a-d* may be structured and operated in a conventional way, as is per se known, and as is e.g. presently used in Stora Enso Intelligent Fridge, Stora Enso Intelligent Cabinet or Stora Enso Intelligent Refrigerator, all provided by the applicant. The internal reader antenna(s) may e.g. be arranged on, or integrated with, shelves of the cabinet. The internal reader antenna(s) may be connected to the RFID reader system via a cable or the like.

In embodiments, there may be provided only one internal reader antenna. However, it is also feasible to use more than one internal reader antenna, such as 2 or 3 antennas, or even more. In case several internal reader antennas are used, they are preferably arranged at different positions within the cabinet, thereby providing complementary reading coverage.

At least one of the internal reader antenna(s) is preferably an omnidirectional antenna, thereby providing coverage over a relatively great part of the internal cavity of the cabinet. However, one or more of the internal reader antenna(s) may be also be directional antenna(s).

The internal reader antenna may be arranged in various places in the cabinet. Further, more than one internal reader antenna may be provided within the cabinet. Preferably, the internal reader antenna(s) are arranged to have its/their reading zones covering the entire interior space of the cabinet, and preferably with an overlap so that at least some positions, and preferably most positions, and most preferably all positions within the cabinet are covered by at least two antennas.

In a preferred embodiment, the at least one internal reader antenna 25, 25*a-d* may be arranged connected to or integrated with a shelf 23 of the cabinet 2. In the illustrative example of FIG. 1*a*, a single internal reader antenna 25 is arranged on the bottom of a shelf 23. In an alternative embodiment, as illustrated in FIG. 2, four internal reader antennas 1 are provided, e.g. arranged on different shelves 23 of the cabinet. Alternatively, or additionally, one or more internal reader antenna(s) may also be provided at other locations in the cabinet, such as in or on the roof, in or on the floor, or in or at the side walls.

The at least one external reader antenna(s) 26*a-d* is/are also connected to the RFID reader system, preferably by a cable, and may be arranged on a front side of the cabinet. In particular, as illustrated in FIG. 1*b*, an external reader antenna 26*a* may be arranged on the door 21, and preferably relatively centrally on the door. Additionally, or alternatively, an external reader antenna 26*b* may be arranged on the door handle, and/or an external reader antenna 26*c* may be arranged on the payment terminal holder. Additionally, or alternatively, an external reader antenna 26*d* may also be arranged above the door, e.g. in the compartment 20*a* housing the RFID reader system etc. In this case, the external reader antenna may also be covered by a protective panel or the like. These locations have all been found to be very efficient in establishing contact with, and reading, RFID tags that have been removed from the cabinet, and also are well RF separated from the inside of the cabinet. Further, when arranged on, or in close vicinity to, the door, an EMI film arranged on the door may serve as a ground plane for the antenna(s).

In a preferred embodiment, the external reader antenna(s) is/are arranged at a distance from any potential points of RF leakage from the inside. For example, the external reader antenna(s) may be arranged at a distance from all boundaries of a door opening of the door. The distance is preferably at least 5 cm, and preferably at least 10 cm, and most preferably at least 15 cm.

In embodiments, there may be provided only one external reader antenna. However, it is also feasible to use more than one external reader antenna, such as 2 or 3 antennas, or even more. In case several external reader antennas are used, they are preferably arranged at different positions on the cabinet, thereby providing complementary reading coverage.

At least one of the external reader antenna(s) is preferably a directional antenna. Use of directional antennas limits the reading coverage, and the area in which reading can be made. Preferably, the directional antennas are directed in such a way that the coverage area is reduced only to an area relatively close to the cabinet, and in particular to the front side of the cabinet.

The internal and external reader antennas may be of various types, as is per se known in the art. The antennas may e.g. be monopole, dipole, patch, and/or slot antennas.

The door of the cabinet is preferably provided with a window covered with an electromagnetic interference (EMI) film. Hereby, RF separation is obtained, minimizing the risk of the external reader antenna(s) reading RFID tags which are still inside the cabinet. The EMI film may also form a ground layer for the external reader antenna(s).

Further, the RFID reader system is preferably configured to determine when the door of the cabinet is opened and closed. For example, the system may comprise a sensor 28 connected to the RFID reader system 27, and particularly to the controller 27*b*, and arranged to determine when the door is in a closed and open state, respectively. Various types of sensors may be used for this purpose, such as a visual sensor, a temperature sensor, a pressure sensor, etc. However, in a preferred embodiment, the sensor is a switch or the like connected to the door, for example arranged to open or close an electric circuit when the door is opened and closed.

Figure 3:
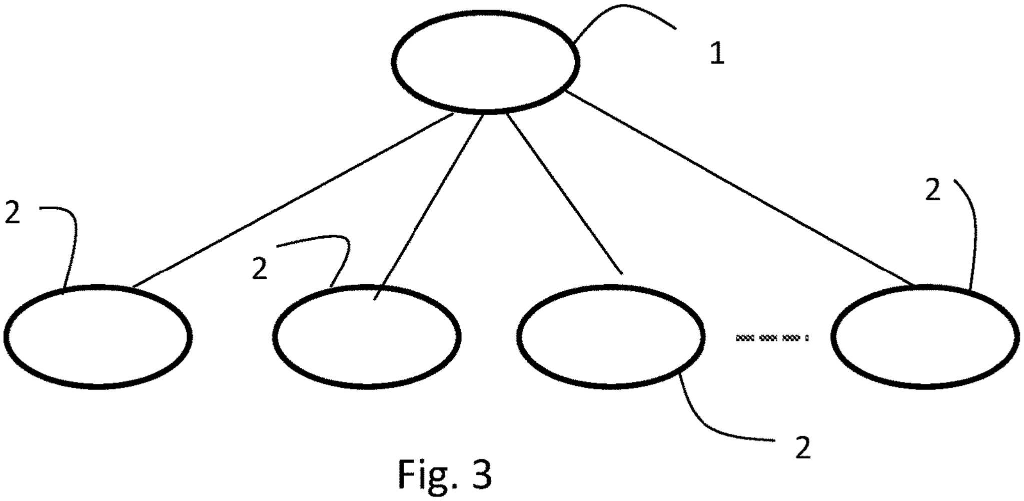
FIG. 3 is a schematic diagram illustrating a system comprising a plurality of intelligent cabinets, in accordance with an embodiment of the present invention.

The intelligent cabinet may be operated as a stand-alone unit. However, preferably, the intelligent cabinet is connected together with one or more other intelligent cabinets, in a network of intelligent cabinets. Such an arrangement is illustrated schematically in FIG. 3. Here, each intelligent cabinet has its own RFID reader system, forming a host layer at each cabinet. The cabinets 2 may then be connected to a central controller 1. The connection can be made wireless, e.g. through WiFi, or by wire, such as by an Ethernet network. The central controller 1 may be responsible for high end functionality, but may also assume some of the host layer functions.

Figure 4:
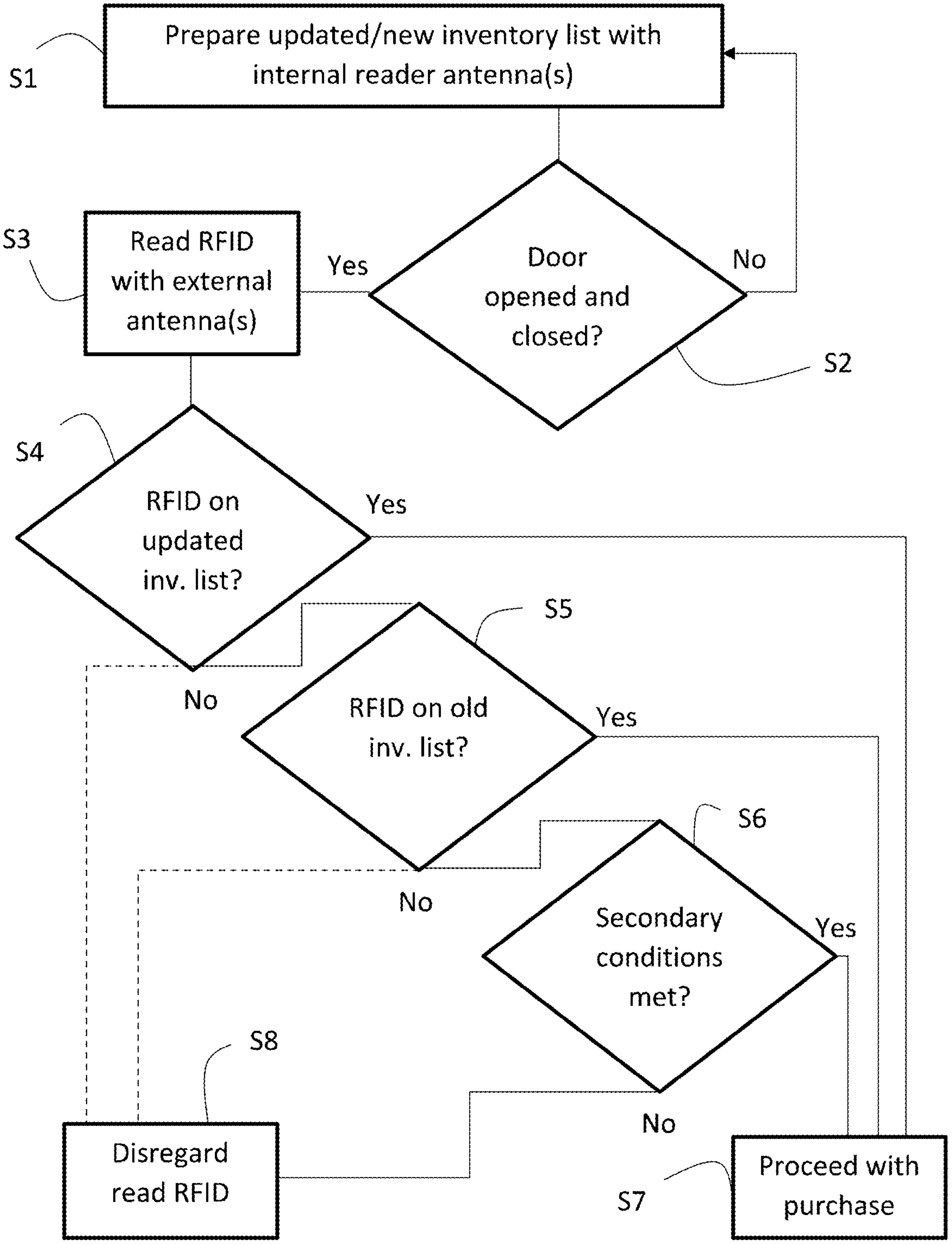
FIG. 4 is a flow chart illustrating a method in accordance with an embodiment of the present invention.

The configuration and operation of the RFID reader system will now be discussed in further detail, with reference to FIG. 4. The method is preferably conducted primarily, and preferably totally, within the RFID reader system 27, and in particular in the controller 27*b*.

In a first step S1 an inventory list is prepared when the system is initialized, or updated if an old inventory list is already available. This is made by reading the RFID tags within the cabinet through the one or more internal reading antenna(s) 25, 25*a-d*. If several internal reading antennas, the reading is preferably made by one internal reading antenna at a time, in a sequential order. The inventory list updating can be made as a background process whenever the door 21 is in a closed state.

If it is determined, in a step S2, that the door has been opened, operation of the antennas may be inactivated, or the readings made of the antennas be disregarded. When it is then determined that the door 21 has once again been closed, the process proceeds to step S3, where the external reading antennas are activated to read any RFID tag available for interrogation.

It is then determined, in step S4, whether any RFID tag having been read is available on the current inventory list. If this is the case, this may be interpreted as a product with this RFID tag having been brought out from the cabinet. The process may then proceed to step S7, to proceed with the purchase. In addition, it may be evaluated whether the same RFID tag is no longer readable by the internal reading antennas. If this is the case, this may be taken as a further confirmation that the product has been removed from the cabinet. However, even if an internal reading antenna would still be able to read the RFID tag, this may be due to RF leakage through the cabinet housing, and is no indication that the product will still be within the cabinet. Thus, regardless of whether the internal reading antennas can contact the RFID tag or not, the process may still proceed to step S7.

In case an RFID tag read by the external reading antenna(s) cannot be found in the current inventory list, this may be taken as a reading of an RFID tag that has not been removed from the cabinet, such as an RFID tag carried by the user or for other reasons present in the vicinity of the cabinet. The process may then continue to step S8 (indicated by a dashed line), where the read RFID tag is ignored and disregarded.

However, alternatively, in another embodiment, the process may continue with a second evaluation step S5. Here, the read RFID tag may be compared to one or more inventory list(s) older than the current one, i.e. one or more historic inventory lists. Such historic inventory lists may comprise RFID tags which are up till now still present in the cabinet, but which have lately not been readable by the internal reading antennas. The reason for this could e.g. be a change in the internal environment in the cabinet, due to new products coming in and/or other products being taken out.

In case an RFID tag read by the external reading antenna(s) cannot be found in any historic inventory list either, this may be taken as a reading of an RFID tag that has not been removed from the cabinet, such as an RFID tag carried by the user or for other reasons present in the vicinity of the cabinet. The process may then continue to step S8, where the read RFID tag is ignored and disregarded.

However, alternatively, in another embodiment, the process may continue with a third evaluation step S6. Here, the reading of the read RFID tag may be analyzed in more detail, and may be evaluated based on secondary conditions. For example, it may be determined if the signal strength, such as RSSI, is above a predetermined threshold level, and/or if an estimated distance to the RFID tag is below a predetermined threshold level. If the one or more secondary conditions are met, the RFID tag reading may still be considered to be a removal of a product from the cabinet, and the process may proceed to step S7, to proceed with the purchase. In this case, the inventory list may also be complemented in correspondence with the new RFID tag reading.

However, if the secondary criteria is not found to be met, the process may proceed to step S8, and the reading of the RFID tag may be ignored or disregarded.

Following step S7 or S8, the process may then iteratively return to step S1, and start anew.

Several alternatives to the above discussed method are feasible. For example, any reading of an RFID tag by the external reading antenna(s) may be used to proceed to the purchase step S7. Thus, in such an embodiment, the process would return directly from step S3 to S7. This may in particular be used when the risk of reading of other RFID tags, not having resided in the cabinet, is considered low or negligible.

Further, as already discussed, the steps S5 and S6 may be omitted, so that the process immediately proceeds to step S7 or S8 from S4, or only step S6 may be omitted, so that the process immediately proceeds to step S7 or S8 from S5.

It is also feasible to proceed with the step in a different orders, such as performing step S6 prior to step S4 or after step S4 but prior to step S5.

As another alternative, the process may omit steps S4 and S5, and proceed directly to step S6 from S3, thereby only evaluating whether one or more secondary criteria is/are met before proceeding to the purchase step S7, or to the disregard step S8. As another alternative, the process may proceed directly to step S6 from step S4, thereby omitting step S5.

As yet another alternative, the process may combine steps S4 and S5 by comparing the read RFID tag with a consolidate inventory list, based on the current inventory list but complemented with any inventory item that has been stored into the cabinet, and e.g. present in historic inventory lists, and which has not been recorded as later being moved out from the cabinet.

Signal strength and similar measurable parameters may be used as secondary considerations, as discussed in the foregoing. However, it is also possible to use such secondary criteria may also be used to determine whether to consider a RFID tag reading from an external reading antenna, or to ignore it. To this end, the RFID reader system may be configured only to use readings from the external reader antenna(s) when the signal strength is exceeding a predetermined threshold value. For example, the RFID reader system may be configured to disregard readings from the external reader antenna(s) when the signal strength, such as the received signal strength indication (RSSI) is below the predetermined threshold value. Similarly, the RFID reader system may further be configured only to use readings from the internal reader antenna(s) when the signal strength is exceeding a predetermined threshold value. For example, the RFID reader system may be configured to disregard readings from the internal reader antenna(s) when the signal strength, such as the received signal strength indication (RSSI) is below the predetermined threshold value.

The person skilled in the art realizes that the present invention is not limited to the above-described embodiments. For example, the positioning of the internal and external reader antennas may vary, and also the number of internal and external reader antennas, respectively. Further, there are various ways to use the readings from the external reader antenna for determining whether a product has been removed from the cabinet, as exemplified in the foregoing.

Such and other obvious modifications must be considered to be within the scope of the present invention, as it is defined by the appended claims. It should be noted that the above-described embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A detection system for detecting RFID tags, the detection system comprising:

a cabinet having a door movable between a closed state and an open state;

an RFID reader system; and at least one internal reader antenna connected to the RFID reader system, arranged inside said cabinet, and configured for reading RFID tags within said cabinet, wherein the detection system further comprises at least one external reader antenna connected to the RFID reader system, arranged outside said cabinet, and configured for reading RFID tags outside said cabinet, the RFID reader system being configured to detect RFID tags having been moved out from said cabinet based on the readings made by both the at least one internal reader antenna and the at least one external reader antenna, wherein the RFID reader system detects one or more RFID tags having been moved out from said cabinet based on a first reading from the at least one internal reader antenna of the RFID tags, prior to the door being moved into an open state, and a subsequent second reading from the at least one external reader antenna of the RFID tags, after the door has been moved to the closed state, wherein each reading from the at least one internal reader antenna is stored in a historic inventory list, which is consulted by the RFID reader system when at least one detected RFID tag in the subsequent second reading from the at least one external reader antenna does not match any RFID tag in the first reading from the at least one internal antenna, and wherein the RFID reader system determines whether the at least one detected RFID tag in the subsequent second reading, which does not match any RFID tag in the first reading, meets at least one secondary condition for identification as a product removed from the cabinet.

2. The detection system of claim 1, further comprising a sensor connected to the RFID reader system and configured to determine when the door is in the closed state and the open state, respectively.

3. The detection system of claim 2, wherein the RFID reader system is configured to detect RFID tags having been moved out from said cabinet based on the readings made by both the at least one internal reader antenna and the at least one external reader antenna when the door has been determined to be in the closed state.

4. The detection system of claim 1, wherein each external reader antenna is configured to have a reading zone outside the cabinet with at least 10 dB attenuation towards the inside of the cabinet.

5. The detection system of claim 1, wherein the cabinet is an RF attenuating cabinet, and wherein the door and walls of the cabinet are RF attenuating.

6. The detection system of claim 5, wherein the door and walls of the cabinet have RF attenuation of at least 10 dB.

7. The detection system of claim 1, wherein the RFID reader system is configured only to use readings from the at least one external reader antenna when a signal strength exceeds a predetermined threshold value.

8. The detection system of claim 1, wherein the at least one external reader antenna is arranged on a front side of the cabinet.

9. The detection system of claim 1, wherein the at least one external reader antenna is arranged on at least one of: the door, a door handle, a payment terminal holder, above the door, or any combination thereof.

10. The detection system of claim 1, wherein the at least one external reader antenna is a directional antenna.

11. The detection system of claim 1, wherein the at least one internal reader antenna is configured to provide directional and omnidirectional coverage.

12. The detection system of claim 1, wherein the door is provided with a window covered with the electromagnetic interference film.

13. The detection system of claim 1, wherein the first reading from the at least one internal reader antenna of said RFID tag is from a time period just prior to the movement of the door to the open state, during which no other openings of the door have been made.

14. A method for detecting RFID tags, the method comprising:

reading RFID tags arranged inside a cabinet with at least one internal reader antenna connected to an RFID reader system;

storing each reading from the at least one internal reader antenna in a historic inventory list;

determining that a door of the cabinet has been moved from a closed state to an open state, and then moved back to the closed state;

reading RFID tags arranged outside the cabinet with at least one external reader antenna connected to the RFID reader system;

detecting one or more RFID tags having been moved out from the cabinet based on a first reading by the at least one internal reader antenna prior to the movement of the door, and a subsequent second reading by the at least one external reader antenna after the movement of the door, consulting the historic inventory list when at least one detected RFID tag in the subsequent second reading by the at least one external reader antenna does not match any RFID tag in the first reading by the at least one internal reader antenna, and determining whether the at least one detected RFID tag in the subsequent second reading by the external reader antenna which does not match any RFID tag in the first reading by the internal reader antenna meets at least one secondary condition for identification as a product removed from the cabinet.

15. The detection system of claim 5, wherein the door and walls of the cabinet have RF attenuation in a range of 10-30 dB.

16. The detection system of claim 1, wherein the at least one secondary condition comprises one or more of determination of a signal strength and determination of a distance of the read RFID tag relative to the cabinet.

17. The method of claim 14, wherein determining whether the RFID tag read in the second reading by the external reader antenna meets at least one secondary condition comprises at least one of:

determining whether a signal strength of the second reading is above a predetermined threshold; and determining whether an estimated distance of the read RFID tag relative to the cabinet is below a predetermined threshold.

* * * * *